US008924381B2

(12) United States Patent
Trollman

(10) Patent No.: US 8,924,381 B2
(45) Date of Patent: Dec. 30, 2014

(54) DETERMINING USAGE OF AN ENTITY

(75) Inventor: David Trollman, Woodside, CA (US)

(73) Assignee: B4UGO Inc., Woodside, CA (US)

( * ) Notice: Subject to any disclaimer, the term of this patent is extended or adjusted under 35 U.S.C. 154(b) by 210 days.

(21) Appl. No.: 13/065,746

(22) Filed: Mar. 28, 2011

(65) Prior Publication Data
US 2011/0184743 A1    Jul. 28, 2011

Related U.S. Application Data

(63) Continuation-in-part of application No. 12/655,990, filed on Jan. 11, 2010, now abandoned.

(60) Provisional application No. 61/204,724, filed on Jan. 9, 2009.

(51) Int. Cl.
G06F 7/00 (2006.01)
G06Q 10/10 (2012.01)
G06Q 10/06 (2012.01)

(52) U.S. Cl.
CPC ............... *G06Q 10/10* (2013.01); *G06Q 10/06* (2013.01)
USPC .......................................................... 707/732

(58) Field of Classification Search
None
See application file for complete search history.

(56) References Cited

U.S. PATENT DOCUMENTS

| | | | | |
|---|---|---|---|---|
| 2001/0037226 A1* | 11/2001 | Kurokawa | ........................... | 705/5 |
| 2002/0062236 A1* | 5/2002 | Murashita et al. | ................. | 705/5 |
| 2002/0103676 A1* | 8/2002 | Yamaguchi et al. | .............. | 705/3 |
| 2002/0160817 A1* | 10/2002 | Salmimaa et al. | ............ | 455/566 |
| 2003/0120728 A1* | 6/2003 | Kuroda et al. | ................. | 709/203 |
| 2004/0019584 A1* | 1/2004 | Greening et al. | .................. | 707/1 |
| 2005/0080675 A1* | 4/2005 | Lovegreen et al. | ............. | 705/15 |
| 2005/0108281 A1* | 5/2005 | Kim et al. | .................. | 707/104.1 |
| 2005/0221806 A1* | 10/2005 | Sengupta et al. | .......... | 455/414.3 |
| 2006/0143080 A1* | 6/2006 | Garg et al. | ....................... | 705/14 |
| 2006/0247946 A1* | 11/2006 | Gordon | ............................. | 705/1 |
| 2006/0277550 A1* | 12/2006 | Williams et al. | .............. | 718/107 |
| 2007/0042748 A1* | 2/2007 | MacArthur | ................... | 455/403 |
| 2007/0136118 A1* | 6/2007 | Gerlach et al. | ..................... | 705/8 |
| 2007/0198359 A1* | 8/2007 | Kannan et al. | .................. | 705/26 |
| 2007/0198368 A1* | 8/2007 | Kannan et al. | .................. | 705/26 |
| 2007/0210937 A1* | 9/2007 | Smith et al. | ................. | 340/995.1 |
| 2007/0230374 A1* | 10/2007 | Altberg et al. | ................ | 370/271 |
| 2007/0233291 A1* | 10/2007 | Herde et al. | .................... | 700/91 |
| 2007/0239348 A1* | 10/2007 | Cheung | .......................... | 701/200 |
| 2007/0239474 A1* | 10/2007 | Christie | ............................. | 705/1 |
| 2007/0250355 A1* | 10/2007 | Leet et al. | .......................... | 705/5 |
| 2007/0263836 A1* | 11/2007 | Huang | ...................... | 379/265.01 |
| 2008/0055051 A1* | 3/2008 | Snyder et al. | ............ | 340/286.09 |
| 2008/0107304 A1* | 5/2008 | Coulter et al. | ................. | 382/103 |
| 2008/0267107 A1* | 10/2008 | Rosenberg | ..................... | 370/312 |
| 2008/0270230 A1* | 10/2008 | Hendrickson et al. | .......... | 705/14 |
| 2009/0055208 A1* | 2/2009 | Kaiser | ............................... | 705/1 |
| 2009/0187460 A1* | 7/2009 | Pavagadhi et al. | .............. | 705/10 |

* cited by examiner

*Primary Examiner* — Tony Mahmoudi
*Assistant Examiner* — Michael Le
(74) *Attorney, Agent, or Firm* — David Lewis

(57) ABSTRACT

A computerized system and methods for determining a schedule and availability of an establishment's products and services for a user that includes a server system with a processor, an input system and an output system. There is also a plurality of system units that access the server system through a communications network and a web server application with an application for collecting information about usage of the establishments, providing the usage information and usage times and a wireless portal and a website on the server system with web pages for entering the schedule and availability of the establishment's products and services related information.

27 Claims, 14 Drawing Sheets

700

B4UGO
GO WHEN THE GOING'S GOOD

GET READY TO GO
LATE SUMMER 2009

IF YOU'RE HERE REPRESENTING A BUSINESS – A RESTAURANT, A CLUB, OR EVEN A MUSEUM – YOU'RE PROBABLY

EDIT THIS DAY ✕

SUNDAY    ● CLOSED   ● 1 TIME   ● 2 TIMES   ● 3 TIMES   ● 4 TIMES — 740

LINE 1   LINE 2   LINE 3   LINE 4

THE LINE FORMS STARTING AT

720 — |6am  8  10  12pm  2  4  6  8  10  12am  2|

AT ITS PEAK, ITS THIS LONG:

710 — |5min  10  15  20  25  30  35  40  45  50  55+|

IT GOES AWAY BY

730 — |6am  8  10  12pm  2  4  6  8  10  12am  2|

[DONE] — 798

YOUR BUSINESS INFO                    [<< EDIT DETAILS]

CONTACT:                HOLIDAYS:           LINES AFFECTED BY WEATHER:
750 — Ridiculously Long                      Yes — 790
      Business Name     Jan - New Years, MLK Day    LINES AFFECTED BY SCHOOL YEAR:
      Listed Here       Feb - Valentine's Presidents   Yes (+20%) — 795
760 — Address Line 1    Apr - Easter
      Address Line 2    May - Memorial
                        Jul - July 4, July 5    } 785
770 — Contact Name      Sep - Labor
780 — Contact E-mail    Oct - Columbus, Halloween
                        Nov - Veterans, Turkey Thu, Turkey Fri
                        Dec - 24, 25, 26, 31

FIG. 7

DETERMINING USAGE OF AN ENTITY

CROSS REFERENCE TO RELATED APPLICATIONS

This application is a continuation-in-part of application Ser. No. 12/655,990, filed Jan. 11, 2010, now abandoned which claims priority benefit of U.S. Provisional Patent Application No. 61/204,724, filed Jan. 9, 2009. All of the above applications are incorporated herein by reference.

FIELD

This specification generally relates to a computerized system that aids with scheduling.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Various establishments have heavier usage at some times than at others. A user may arrive at a popular facility at a time when the facility is busy and consequently receive delayed service detracting from the experience.

SUMMARY

In one embodiment, at least one information-providing site, such as a website and/or wireless portal may be provided that serves up information to optimize decisions related to when to visit various entities (e.g., establishments, such as popular services and attractions), so as to minimize delays due to heavy use of the establishments, such as popular services and attractions.

In another embodiment, the information-providing site may provide information about when establishments such as services, attractions and/or transportation systems are in heavy use and/or are in light use. Some examples of services that may be included in the system are retail and dining establishments, banks and post offices. Some examples of attractions that may be included in the system are entertainment and exhibits, such as amusement parks, museums, ski slopes and/or other attractions or entertainments. Some examples of a public transit system that may be included in the system may be roadways, buses, taxis, liveries, limousines, trains, trolleys, trams, subways, monorails, airports, airplanes and/or other transit systems. By knowing when such establishments are least used by the public and therefore most readily available, the user may use the establishments at times and/or in the case of transportation along routes that have fewer delays due to heavy use.

In another embodiment, queries regarding the amount of use of an establishment at a particular time may be sent from a network device to an information-providing site. Some examples of network devices that may be used for sending and receiving communications related to the usage of the establishments are computing devices and mobile devices such as cell phones, wireless IP devices, laptops, personal computers and/or other devices that connect to a Wide Area Network (WAN) or other communications network via which an information-providing site may be accessed. The information-providing site may be a website, wireless portal and/or other information-providing site that provides the information when accessed. The information-providing site may be located at a host site where a database of usage patterns of various establishments may be stored and where algorithms may be stored for computing usage patterns, predicting future usage and/or suggesting times to use the establishments (or not to use the establishments) to avoid periods of high usage. The website and/or wireless portal may start with the best available information on public use patterns of services and attractions and refine the initial information by concatenating user input. It may project delay times, based on historic use by hour, by day and by date and/or revise usage patterns given user input so that users can make informed decisions about when to depart for these services and attractions to minimize delay.

In another embodiment, the information-providing site may compute optimized departure times based on the expected use at various times and user preferences. The user preferences may includes times of day when the user is free to visit a particular establishment, the amount of time delay that the user may have to wait, the location of the user and the location of the establishment that the user would like to visit.

In another embodiment, anticipated use patterns may be projected based on authoritative estimates of past use or inferred from the use patterns of similar establishments, such as services and attractions, which may be gathered from the operators, managers and/or users of the establishments. There may be at least two sorts of user supplied reports. One sort of user report may be a relative usage report that includes symbolic ratings or a form of qualitative data, such as one to five stars. There may also be an absolute report with actual wait or transit times or other quantitative data. Although users may not accurately report wait or transit times, in cases where qualitative data exist for instrumented roadways or wait lines a relationship may be established that may allow wait or transit times to be projected from qualitative data for wait lines or roadways that are not instrumented. For example, if based on locations where both types of reports are collected it is determined that one star corresponds on average to users moving at 1 mile per hour, then, if users on average report one star on a road where quantitative data is not collected, it may be assumed that the usage is moving at one mile per hour. Similarly, if one star corresponds on average to a wait line lasting one hour, then if users report one star in uninstrumented wait lines it may be inferred that wait lines are lasting one hour. Although in this example a star is used, in another embodiment other icons may be used instead of a star, such as a check or a thumbs up.

Any of the above embodiments may be used alone or together with one another in any combination and may also include embodiments that are only partially mentioned or alluded to or are not mentioned or alluded to at all in this brief summary or in the abstract.

BRIEF DESCRIPTION OF THE FIGURES

In the following drawings like reference numbers are used to refer to like elements. Although the following figures depict various examples of the invention, the invention is not limited to the examples depicted in the figures.

FIG. 7 illustrates an example of a screenshot of a web page for an operator of an establishment to verify information about wait-times related to their establishment.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification and some embodiments may not address any of these deficiencies.

In the following drawings like reference numbers are used to refer to like elements. Although the following figures depict various examples of the invention, the invention is not limited to the examples depicted in the figures.

Figure 1:
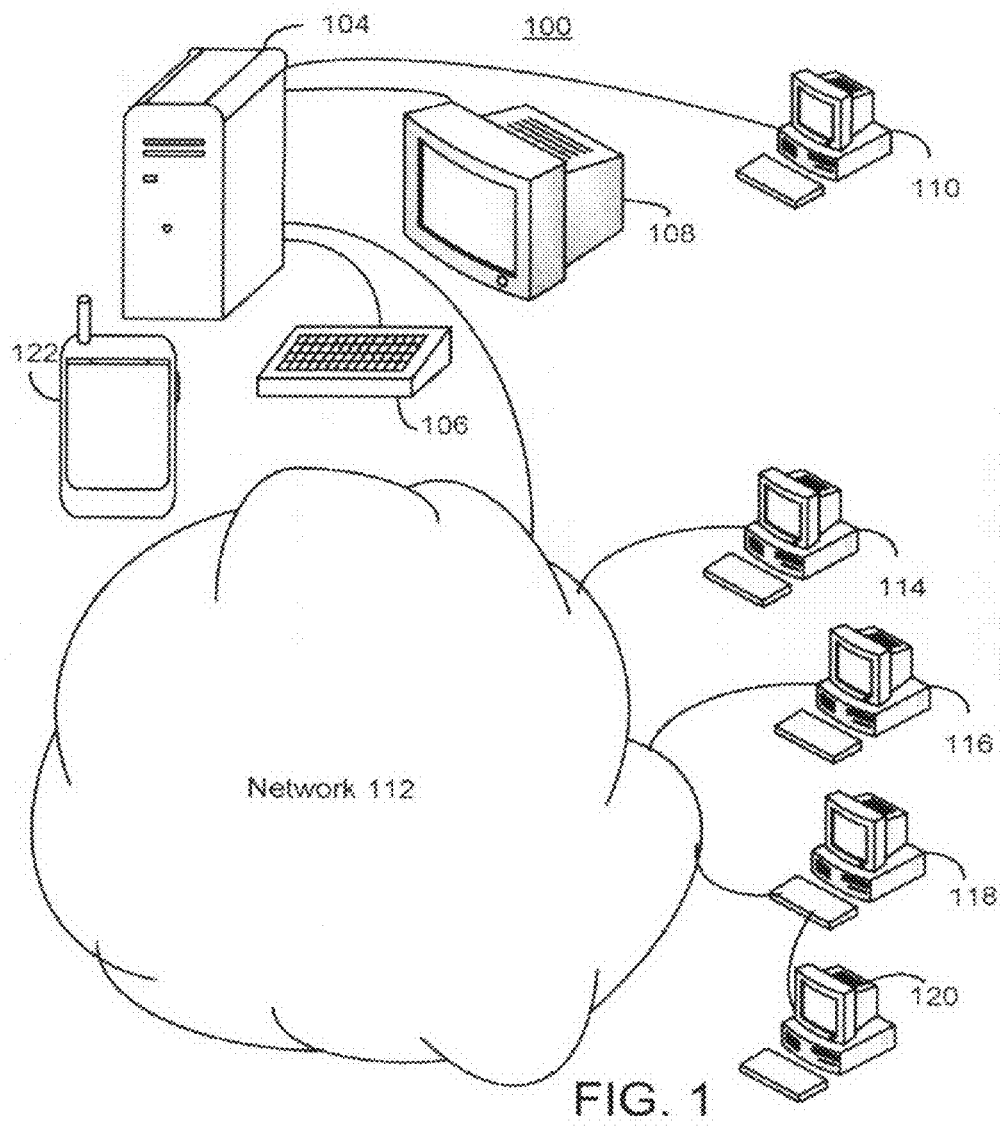
FIG. 1 illustrates a block diagram of an embodiment of a system for determining a schedule and availability of an establishment's products and services.

FIG. 1 illustrates a block diagram of an embodiment of a computerized system 100 for determining a schedule and availability of an establishment's products and services. The computerized system 100 includes a server system 104, an input system 106, an output system 108, a plurality of client systems 110, 114, 116, 118 and 120, a communications network 112 and a hand-held device 122. In other embodiments, the computerized system 100 may include additional components and/or may not include all of the components listed above.

Server system 104 may include one or more servers. One server 104 may be the property of the distributor of the software and then each individual establishment may have their own server also. In other embodiments, the computerized system 100 may include additional components and/or may not include all of the components listed above.

Input system 106 system may be used for entering input into server system 104, and may include any one of, some of, any combination of, or all of a keyboard system, a mouse system, a track ball system, a track pad system, buttons on a handheld system, a scanner system, a wireless receiver, a microphone system, a connection to a sound system, and/or a connection and/or an interface system to a computer system, intranet, and/or the Internet (e.g., IrDA, USB), for example.

Output system 108 may be used for receiving output from server system 104, and may include any one of, some of, any combination of or all of a monitor system, a wireless transmitter, a handheld display system, a printer system, a speaker system, a connection or interface system to a sound system, an interface system to peripheral devices and/or a connection and/or an interface system to a computer system, intranet, and/or the Internet, for example.

The computerized system 100 illustrates some of the variations of the manners of connecting to the server system 104, which may be information providing site (not shown).

Server system 104 may be directly connected and/or wirelessly connected to the plurality of client systems 110, 114, 116, 118 and 120 and are connected via the communications network 112. Client system 120 may be connected to server system 104 via client system 118. The communications network 112 may be any one of, or any combination of, one or more Local Area Networks (LANs), Wide Area Networks (WANs), wireless networks, telephone networks, the Internet and/or other networks. The communications network 112 may include one or more wireless portals. The client systems 110, 114, 116, 118 and 120 are any system that an end user may use to access the server system 104. For example, the client systems 110, 114, 116, 118 and 120 may be personal computers, workstations, laptop computers, game consoles, handheld network enabled audio/video players and/or any other network appliance.

The client system 120 accesses the server system 104 via the combination of the communications network 112 and another system, which in this example is client system 118. The client system 122 is an example of a handheld wireless device, such as a mobile phone or a handheld network enabled audio/music player, which may also be used for accessing network content. In another embodiment, any combinations of client systems 110, 114, 116, 118, 120 and/or 122 may include a GPS system (which may be discussed in FIG. 2 description, 216) that reports the location of the client system 122 at different times. A handset that automatically generates periodic time-tagged locations, which may be derived from an on-board GPS, may transmit the time tagged locations back for processing. A software program running on a handheld device may thereby determine average speed and/or duration of usage over route segments or for establishments that are heavily used.

Figure 2A:
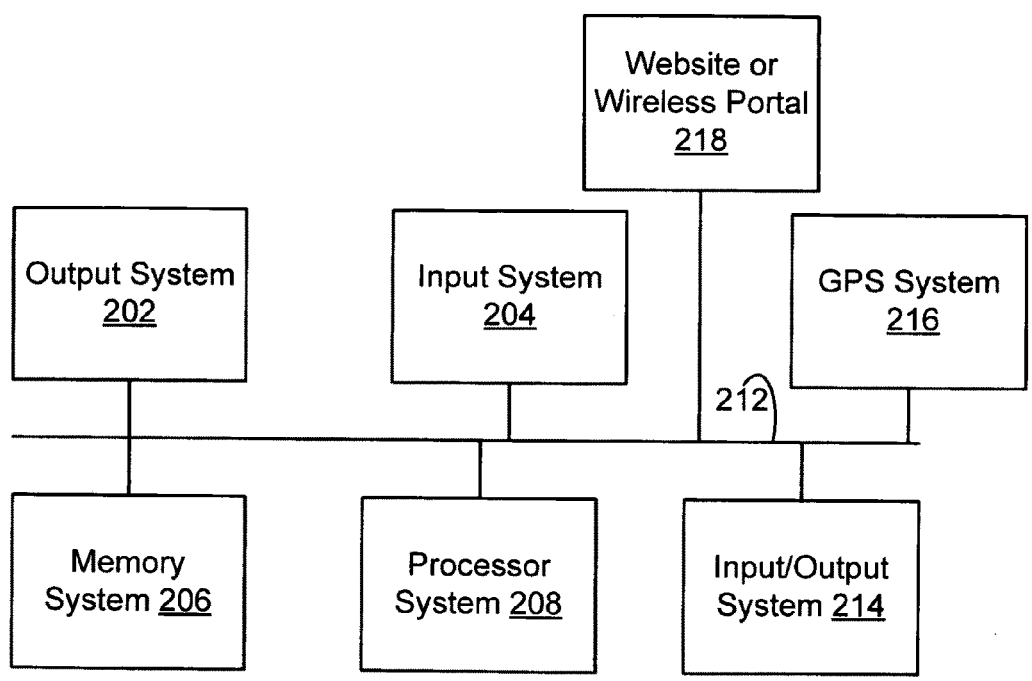
FIG. 2A illustrates a block diagram of an embodiment of a client system that may be used as one of the system units for determining a schedule and availability of an establishment's products and services.

FIG. 2A illustrates a block diagram of an embodiment of a client system 200 that may be used as one of the system units for determining a schedule and availability of an establishment's products and services. Client system 200 may include an output system 202, an input system 204, a memory system 206, a processor system 208, a communications system 212, an input/output system 214, website or GPS system 216 and wireless portal 218. Other embodiments of client system 200 may not have all of the components and/or may have other embodiments in addition to or instead of the components listed above.

The client system 200 may be any one of client systems 110, 114, 116, 118, 120, and/or 122 that may be used as one of the network devices of FIG. 1. In other embodiments, the client system 200 may include additional components and/or may not include all of the components listed above.

Output system 202 may include any one of, some of, any combination of or all of a monitor system, a wireless transmitter, a handheld display system, a printer system, a speaker system, a connection or interface system to a sound system, an interface system to peripheral devices and/or a connection and/or an interface system to a computer system, intranet, and/or the Internet, for example.

Input system 204 may include any one of, some of, any combination of, or all of a keyboard system, a mouse system, a track ball system, a track pad system, buttons on a handheld system, a scanner system, a wireless receiver, a microphone system, a connection to a sound system, and/or a connection and/or an interface system to a computer system, intranet, and/or the Internet (e.g., IrDA, USB), for example.

Memory system 206 may include, for example, any one of, some of, any combination of or all of a long term storage system, such as a hard drive, a short term storage system, such as random access memory; a removable storage system, such as a floppy drive or a removable drive, and/or a flash memory. Memory system 206 may include one or more machine readable mediums that may store a variety of different types of information. The term machine-readable medium is used to refer to any medium that is structurally configured for carrying information in a format that is readable by a machine. One example of a machine-readable medium is a computer-readable medium. Memory system 206 may store an application for receiving, storing, retrieving, and displaying usage information of various establishments, if system 200 is a server for one of the establishments. Memory system 206 may also store machine instructions for computing travel times and optimum times for using different establishments if the system 200 is a server. On the other hand if system 200 is a handheld network device, the memory 206 may include a GPS system 216 with GPS software and software for reporting locations of the user at various time intervals.

The processor system 208 may include any one of, some of, any combination of, or all of multiple parallel processors, a single processor, a system of processors having one or more central processors and/or one or more specialized processors dedicated to specific tasks. Processor system 208 implements the programs stored in the memory system 206.

Communications system 212 communicatively links output system 202, input system 204, memory system 206, processor system 208, and/or input/output system 214 to each other. Communications system 212 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 214 may include devices that have the dual function as input and output devices. For example, input/output system 214 may include one or more touch sensitive screens, which display an image and therefore are an output device and accept input when the screens are pressed by a finger or stylus, for example. The touch sensitive screens may be sensitive to heat, capacitance and/or pressure. One or more of the input/output devices may be sensitive to a voltage or current produced by a stylus, for example. Input/output system 214 is optional, and may be used in addition to or in place of output system 202 and/or input device 204.

A GPS system 216 can also be incorporated into the client systems 110, 114, 116, 118, 120 and 122 with GPS software and software for reporting locations of the user at various time intervals. The GPS system 216 is tied directly into the communications system 212 and can be incorporated into a handheld device 122, such as a mobile phone or a handheld network enabled audio/music player, or the client systems 110, 114, 116, 118 and 120 that an end user may use to access the server system 104.

The client systems 110, 114, 116, 118, 120 and handheld wireless device 122 can also be tied into a website or wireless portal 218 which is also tied directly into the communications system 212. Any website or wireless portal 218 would also include software and a website module (no number) to maintain, allow access to and run the website as well.

Time can be lost at a destination as a result of waiting in lines to access the establishment's services or products due to heavy usage. Information about anticipated wait-times may be gathered from several sources, which may include the operator of the destination, patrons of the establishment and wait-time information gathered from similar sources, such as market research.

An application is provided to operators of establishments that the operators may use to report usage of their establishments (in other embodiments other reporting usages may be used instead of or in addition to an application). For example, the application may include fields for entering delay information for each wait cycle during the day and/or for each day of the week. The application may also include options for reporting how delay patterns vary from week to week and/or month to month. Additionally or alternatively, the application may also provide options for the operators to report how usage of an establishment is affected by such factors as weather, holidays, school vacations, and/or nearby events. The reports may be time-stamped and/or date-stamped. The source of the input may be verified and the operator may be allowed to update the information as often as desired. The information entered may then be displayed for potential patrons to view. In an embodiment, the operator's information may be displayed as reported, unless market research or frequent user reports contradict the operator's information. The information may be displayed in one or more of several different formats. In an embodiment, the wait-time information that the operators report may be displayed in the form of day-long arithmetic curves that includes the times of day that waiting begins to occur, the times of day that waiting stops occurring, and the maximum and/or minimum wait-times for each waiting period. The application may also allow the operator to suggest to users when optimum times might be to access the operator's establishment.

The application may also provide one or more fields (and/or other means) for users to report the wait-times they experience. In an embodiment, the user input may also be time-tagged. Optionally, the user input may also be correlated or keyed to the user, and may also be weighted according to the number of reports the user has sent, and/or how many reliable or malicious reports the user has sent. Whether the inputs are accurate may be determined by comparing the input to expected values, which may be determined from operator input. Expected values may also be inferred from market research based on similar destinations. The difference between the mean of each time reported by a user may also be computed and averaged. For any given user, if the user reports enough times, the average of the differences should tend to zero. The individual reports of the user may be weighted by the average difference from the mean of the user's reported wait-time. The weighted input of all users may be aggregated. A credibility rating may be assigned to each user based on the accuracy and number of the user's reports, and the user's ratings may be adjusted dynamically. Credibility ratings may be displayed with the user's posted comments and browseable account information to incentivize users to report more frequently and accurately.

In addition to the incentives provided by recognition and from attribution and association with a high reliability rating, in an embodiment those that report frequently may be invited to events for "power users." Power users are heavy users of the system. Also, frequent reporters may be rewarded with discounts and "line-cutting passes" (which are passes that allow the holder to advance to the front of the line or enter or receive service immediately without waiting in line) at participating destinations.

Optionally, signal processing algorithms such as noise cancellation, pattern recognition and Fourier transforms (and/or other algorithms) may be applied to user input data to extrapolate daily wait-time curves and weekly and event-driven variations by accounting for such factors as weather, holidays, the school year, and/or other factors, and the results may be displayed in the form of bar charts or line curves generated for time of day and length of wait. In an embodiment, the default display is the current day usage patterns reported by both operators and users, which may be displayed superimposed on one another, and the user may alternatively display other days or combinations of days.

In an embodiment, users are encouraged to provide input on the wait-times they experience not only by the value of the information gained from the display, but also by recognition and reward incentives such as discounts and "line-cutting" passes at participating businesses after a user's contributions reach certain thresholds. To incentivize users to report their experiences, the user is allowed to report a brief, attributed text message that is published in time order along with the usage pattern display, which may be accompanied by a confidence rating, which may be based on the frequency of the user's reports and/or other factors indicating the reliability of the user's reports.

In an embodiment, a website is maintained via which users and/or operators may download the application for reporting wait-times. In an embodiment, the application may include a version that runs on a mobile device, such as a mobile phone (e.g., an iPhone® or similar smart phone). In an embodiment, the website runs an application that accepts input from users and/or operators without downloading any applications. In an embodiment, the primary input for operators may be the website and the primary input means for users may be the mobile application.

The mobile application may allow the user to search for any destination in the database maintained at the server and display the usage patterns reported by the operator and/or other users. In an embodiment, the application may allow users to input the time the user had to wait by one of two or more ways. One or more links and/or other means for reporting wait-times may include sliders that allow the user to specify when the user arrived and how long the user had to wait. Another set of one or more links and/or other means may include a clock allowing the user to indicate when the user's wait begins and when the user's wait-time ends.

For example, there may be two or three separate sliders and/or clocks for inputting the time spent waiting and the start and/or end time of the wait period. In an embodiment, the user application and/or operator application may include fields for entering identifying characteristics of the establishment, such as the address, name, website, and/or phone number of the establishment. In an embodiment, the current wait-time for an establishment may be displayed as a text display having the number of minutes of wait. In an embodiment, future wait-time may be represented by a line graph and/or a bar graph.

The wait-time data may be modified based on weighting user input based on user profile information. User profile information may be modified based on agreement with the wait-times reported by other users, and the number of user reports determined to be accurate may improve the ranking of the user profile. In an embodiment, the bar graph and/or line curve may include an option for displaying an error bar, confidence interval, and/or average standard deviation of the data. In an embodiment, the user may have the option of choosing the Z value of the confidence value (which is the number of standard deviations from the mean) and/or specify the confidence that the wait-time may be a value within the confidence interval.

In a embodiment, the wait time curve for an establishment may be generated as follows. A bell curve starts slowly, then rises and falls sharply, then trails off slowly, which is a good description of the random times a lunch crowd, for example, may shows up at an establishment. For example, a few people drift in early for lunch to the establishment, then a crowd arrives. A peak in the number of people present occurs at, say, 12:15 pm. Then fewer and fewer people show up at the establishment. Then only the laggards appear in the establishment. The bell curve distribution of people that randomly come to visit is often called the Poisson distribution, and describes the distribution of random events around a norm.

A downwards-facing parabolic curve rises quickly, then more slowly, then starts to fall slowly, then falls off quickly. A parabolic curve has a visual similarity to a Poisson distribution and is a reasonable description of wait times experienced by a lunch crowd, for example: people arrive until every seat is taken, then the line lengthens rapidly until tables start freeing up, then it starts to diminish more and more rapidly as more and more leave their tables.

The following equation may be used to draw a parabola curve rising from the wait start time. Specifically, the following equation describes the parabola $$y = 4W(x/T) - 4W(x/T)^2$$

where
y is the wait you have when you arrive
W is the maximum wait
x is when you arrive after the line forms
T is the time when the line disappears after it first disappears The above equation may be derived as follows. Let the wait time y depends on the time arrived. Let's call the time arrived as x, and start the curve at the origin, so by hypothesis $$y = ax^2 + bx + c \tag{1}$$

Since just before the line starts to form the wait time is still zero, plugging x=0 into equation (1) yields $$0 = a0^2 + b0 + c$$

So, $$c = 0$$

Now, at some final time T the line disappears, so $$0 = aT^2 + bT + 0$$

So, $$b = -aT, \quad (2)$$

and the final time is $T = -b/a$.

Now, the maximum wait time W occurs at the vertex of the parabola, which is halfway between the initial time, $x=0$, and the final time $x=T=-b/a$, and consequently the time at which the maximum occurs is $x=-b/(2a)$. Alternatively, the maximum wait time occurs when the first derivative is equal to 0, $2ax+b=0$, which also implies $x=-b/(2a)$.

$$W = a[-b/(2a)]^2 + b[-b/(2a)].$$

Consequently, $$W = -b^2/(4a)$$

Substituting in (1), we have $$W = -aT^2/4$$

So, $$a = -4W/T^2$$

and $$b = 4W/T$$

We can now substitute the newly defined variables into (1)

$$y = 4W(x/T) - 4W(x/T)^2 \quad (3)$$

You can see that $w=0$ at $T_1=0$ and $T_1=T_2$. The maximum wait is half-way in between, when $T_1=T_2/2$, and indeed the wait then is $w=W_m$.

Figure 2B:
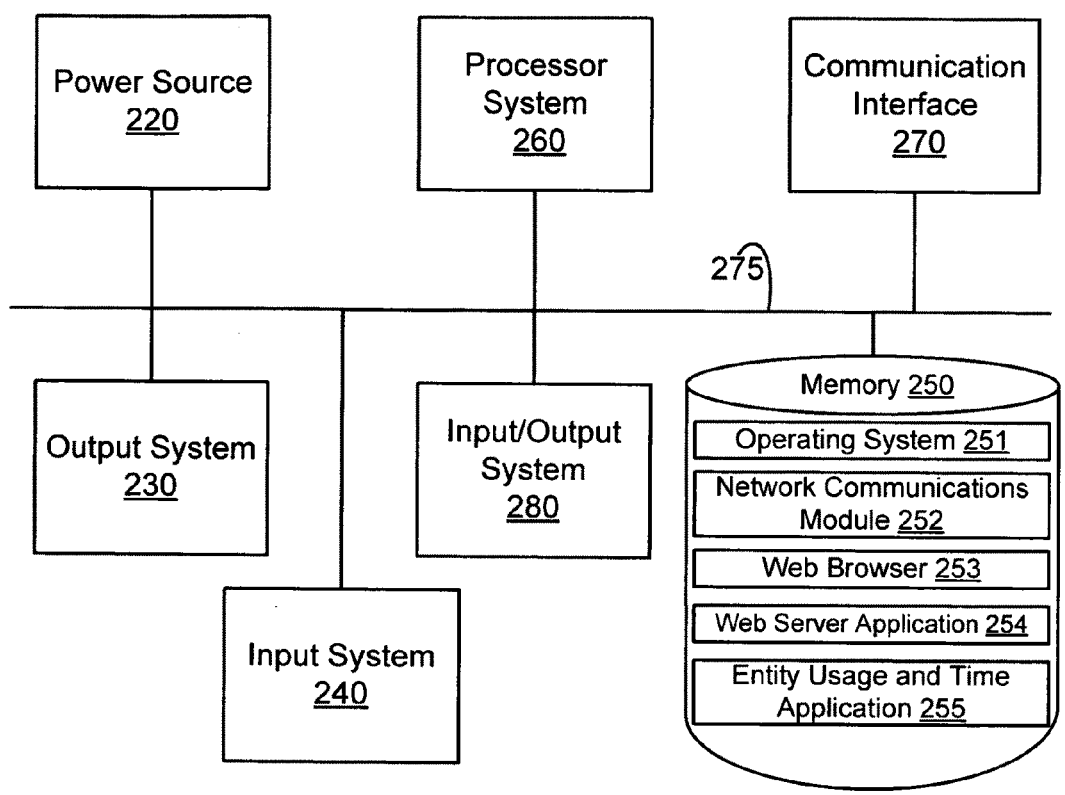
FIG. 2B illustrates a block diagram of an embodiment of a server system that may be used for determining a schedule and availability of an establishment's products and services.

FIG. 2B illustrates a block diagram of an embodiment of a server system 104 that may be used for determining a schedule and availability of an establishment's products and services. The server system 104 may include a power source 220, an output system 230, an input system 240, a memory system 250, which may store an operating system 251, a communications module 252, a web browser module 253, a web server application 254 and a usage information application 255. Server system 104 may also include a processor system 260, a communications interface 270, a communications system 275 and an input/output system 280. In other embodiments, the server system 104 may include additional components and/or may not include all of the components listed above.

Output system 230 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or Internet, for example.

Input system 240 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or Internet (e.g., IrDA, USB), for example.

Memory system 250 may include, for example, any one of, some of, any combination of, or all of a long term storage system, such as a hard drive; a short term storage system, such as random access memory; a removable storage system, such as a floppy drive or a removable drive and/or flash memory.

Memory system 250 may include one or more machine-readable mediums that may store a variety of different types of information. The term machine-readable medium is used to refer to any medium capable carrying information that is readable by a machine. One example of a machine-readable medium is a computer-readable medium. Memory system 250 may store one or more machine instructions for producing web pages for and collecting information for operators or establishments and/or patrons regarding wait-times at different times of the day. The operating system 251 controls all software and hardware of computerized system 100. The communications module 252 enables the server system 104 to communicate on the communications network 112. The web browser module 253 allows for browsing the Internet. The web server application 254 serves web pages to client systems that request the webpages, thereby facilitating browsing on the Internet. The usage information application 255 is software provided to store and to make available information about the usage of the establishment provided by market research and/or the patron or the operator of the establishment on all web pages of computerized system 100 (the operator may also be an owner of the establishment).

Processor system 260 may include any one of, some of, any combination of, or all of multiple parallel processors, a single processor, a system of processors having one or more central processors and/or one or more specialized processors dedicated to specific tasks. Processor system 260 may implement the machine instructions stored in memory system 250.

In an alternative embodiment, communication interface 270 allows the server system 104 to interface with the network 112. In this embodiment, output system 230 sends communications to communication interface 270. Communications system 275 communicatively links output system 230, input system 240, memory system 250, processor system 260 and/or input/output system 280 to each other. Communications system 275 may include any one of, some of, any combination of, or all of electrical cables, fiber optic cables, and/or sending signals through air or water (e.g. wireless communications), or the like. Some examples of sending signals through air and/or water include systems for transmitting electromagnetic waves such as infrared and/or radio waves and/or systems for sending sound waves.

Input/output system 280 may include devices that have the dual function as input and output devices. For example, input/output system 280 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 280 is optional and may be used in addition to or in place of output system 230 and/or input device 240.

Figure 3:
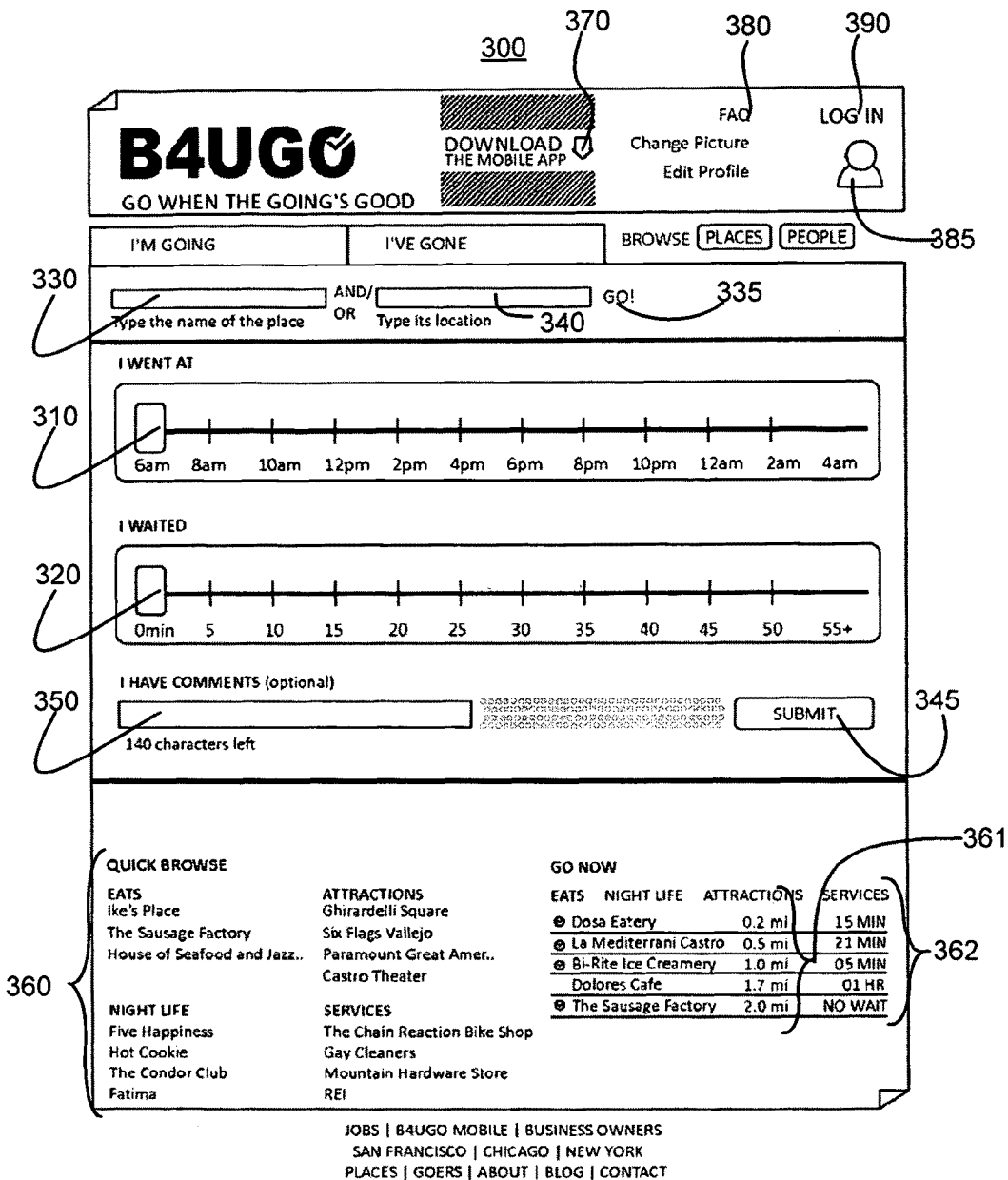
FIG. 3 illustrates an example of a screenshot of a web page for a user to enter wait-times for determining a schedule and availability of an establishment's products and services.

FIG. 3 illustrates an example of a screenshot of a web page 300 for a user to enter wait-times for determining a schedule and availability of an establishment's products and services. Webpage 300 includes a start slider 310, a wait slider 320, a name field 330, a "Go" button 335, a location field 340, a "Submit" button 345, a comments field 350, other establishment information 360, distances 361, wait-times 362, a download link 370, a FAQ link 380, avatar 385, and a login link 390. Other embodiments of screenshot 300 may not have all of the components and/or may have other embodiments in addition to or instead of the components listed above.

Start slider 310 may be a slider for entering a time at which a user started to wait. Wait slider 320 is for the user to enter the amount of time that the user needed to wait. Name field 330 may be a field used by the user to enter the name of the establishment at which the user waited. "Go" button 335 may be a link that causes the display of a suggested time when to go to the establishment to be displayed. Location field 340 may be used by the user to enter the location of the establishment. "Submit" button 345 may be pressed by the user to submit the information that the user entered. Comments field 350 may be a field that may be used by the user to enter a comment about the establishment. Other establishment information 360 includes the name and type of other similar establishments. Distances 361 shows the distances from a current location to other similar establishments. Wait-times 362 show the wait-times for the other establishments. Download link 370 is a link for downloading software to client 122 for recording wait-times and displaying other information about establishments, which may be useful in assisting mobile users like patrons. FAQ link 380 is a link to a page that displays frequently asked questions and answers to the frequently asked questions. Avatar 385 may be an image that the patron may choose to upload and display as a representation of the user, which may be located at the top corner of the web page 300, or elsewhere on the page. Login link 390 is a link to a page with fields for entering login information, such as a password and a user ID.

Figure 4:
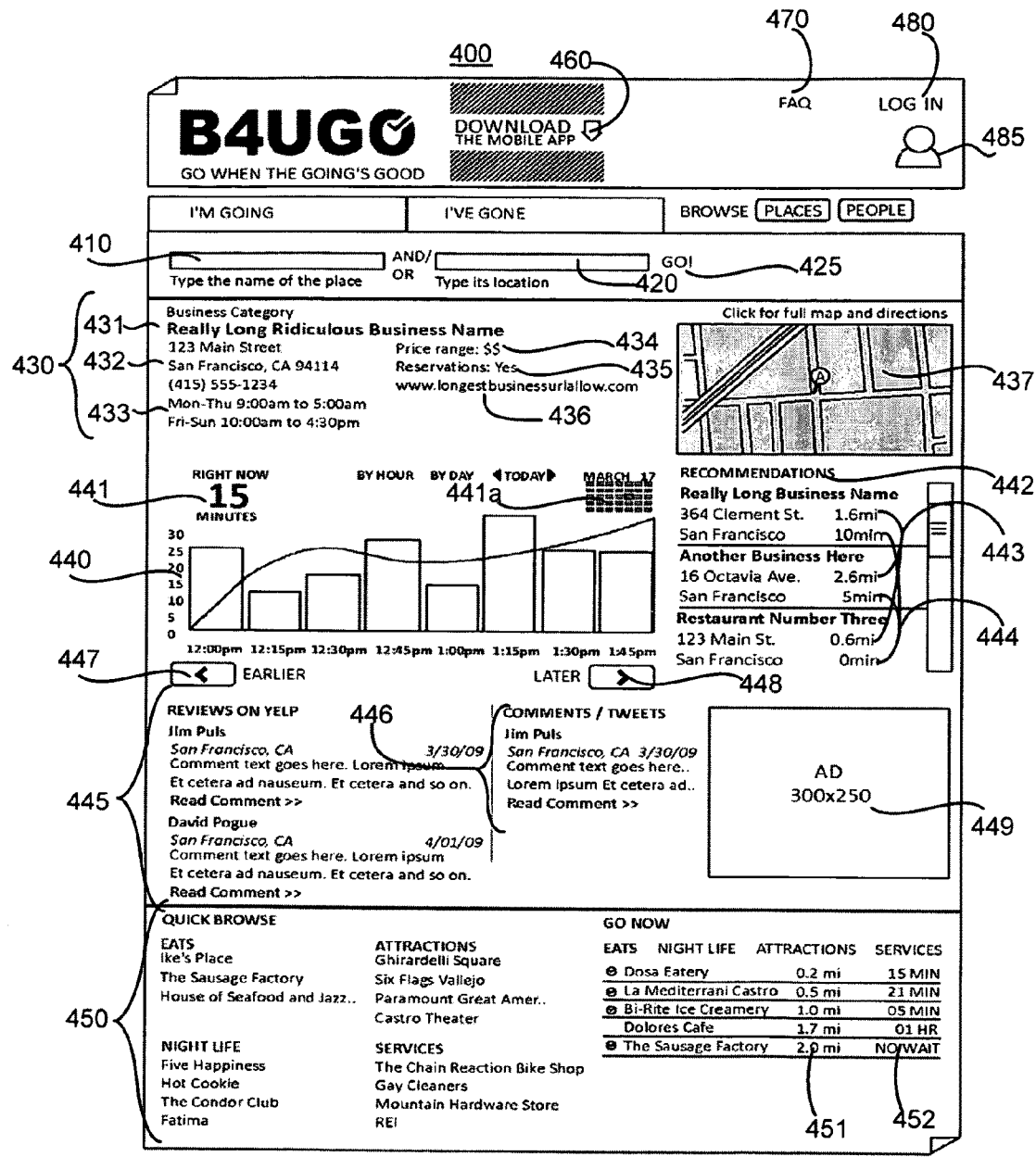
FIG. 4 illustrates an example of a screenshot of a web page for displaying wait-times for an establishment.

FIG. 4 illustrates an example of a screenshot of a web page 400 for displaying wait-times for an establishment. FIG. 4 has fields for entering the name 410, establishment location 420, "Go" button 425, establishment business information 430, establishment name 431, establishment address 432, establishment hours 433, price range 434, reservations requirement 435, URL address 436, map of establishment 437, an establishment wait-time graph 440, a numerical wait-time display 441, login calendar 441a, alternative establishment recommendations 442, wait-times 443 and distances 444 of these establishments, reviews 445, comments and tweets 446, back scroll arrow 447, forward scroll arrow 448, advertisement 449, browsable alternative establishment information 450, distance 451, and wait-times of alternative establishments 452, a mobile application download link 460, a FAQ link 470, a login link 480 and a picture or avatar 485. In other embodiments, web page 400 may include additional components and/or may not include all of the components listed above.

Patron can first enter name 410 of the establishment on the web page 400. Patron can then enter location 420 of the establishment on web page 400. Patron then hits "Go" button 425 to begin submitting information to web page 400. Business information 430 regarding the establishment is then displayed. Business information 430 may include name 431 of establishment for user reference. Business information 430 may also include the address 432 of the establishment for patrons to find establishment. Business information 430 may also include the hours of operation 433 of the establishment so users know when establishment is open and closed. Business information 430 may also include price range 434 of establishment to inform users how expensive products and services are. Business information 430 may also include reservations requirement 435 of establishment to notify users if a reservation is required in order to use establishment products and services. Business information 430 may also include a URL address 436 of establishment for patron to browse establishment website. Business information 430 may also include a map of establishment 437 indicating location of establishment along with any side streets to enable a person to easily locate the establishment.

Graph 440 may include a bar graph and a line graph drawn that are superimposed on one another to represent projected wait times. Graph 440 also may include a numerical display to indicate the current wait-time 441. Calendar 441a, above graph 440, indicates the current calendar date and allows user to specify a date other than the current date, which is the default display. Establishment recommendations 442 may include recommendations of similar nearby establishments that patrons may wish to patronize instead of or in addition to the current establishment. Establishment recommendations 442 include establishment address, distance and wait-times 444 that are adjacent to graph 440 for added convenience (e.g., in case the patron does not want to wait for current establishment and can find another establishment with a shorter wait-time).

Recently dated reviews 445 are located below graph 440 for patrons to review. Comments and tweets 446 may be located below graph 440, which may include comments, the date of the comment, and the author of the comment. Optional advertisement 449, which may be adjacent to comments and tweets 446, may include advertisements that can be purchased by an advertiser. Back scroll arrow 447 may be a scroll arrow for navigating the graph 440. Back scroll arrow 447 may be clicked-on when the cursor is located over back scroll arrow 447 to move graph 440 backwards for a user to see earlier times or days on graph 440. Forward scroll arrow 448 may be another scroll arrow for navigating graph 440. Forward scroll arrow 448 may be clicked-on when the cursor is over forward scroll arrow 448 to move graph 440 forward for a user to see later times or days on graph 440.

FIG. 4 also includes establishment information 450 such as the name and type of other similar establishments that a patron may be interested in. Distance from establishment 451, which may be located next to establishment information 450, may indicate the distance from the current establishment to the user's current location. Establishment wait-times 452 show the wait-times for other establishments, which may be provided adjacent to establishment information 450. Download link 460 is for downloading software for displaying and inputting wait times for an establishment to a patron's mobile computing device, which may be located at the top of the web page 400. FAQ link 470 may be a link to a page that displays frequently asked questions and answers to the frequently asked questions, which may be provided for convenience to patrons regarding answering common questions. Login page 480 is provided for patrons to login to the web page 400, which may include a link to a page with fields for entering login information, such as a password and a user ID. Picture or avatar 485 is an image of the user, which may be provided on top of the screen represented by screenshot 400. Picture or avatar 485 may help patrons to visualize who the user that posted a comment is. Picture or avatar 485 may be uploaded from the patron's computer to the website represented by screenshot 400.

Figure 5:
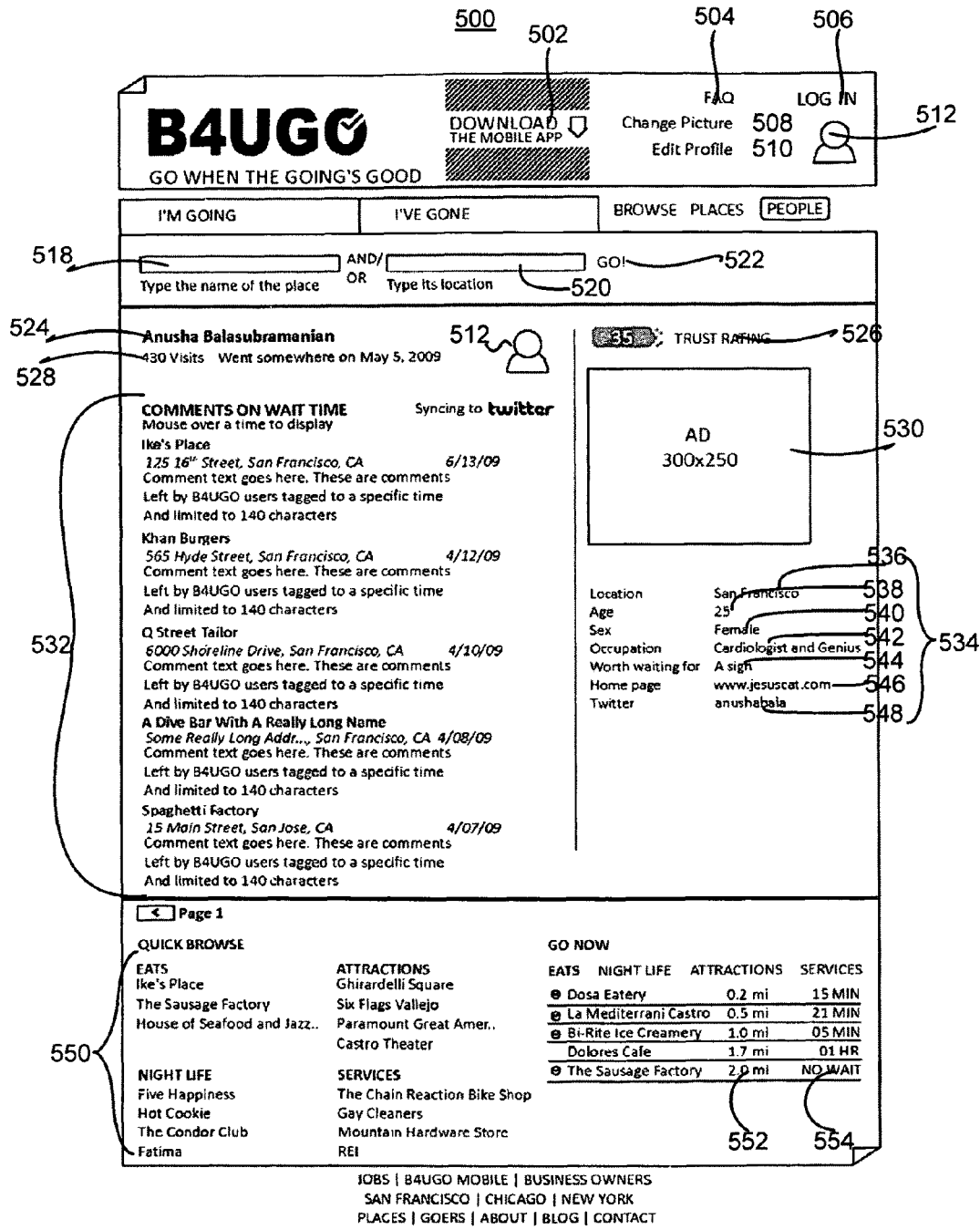
FIG. 5 illustrates an example of a screenshot of a web page for a profile of a user commenting on an establishment.

FIG. 5 illustrates an example of a screenshot of a web page 500 for a profile of a user commenting on an establishment. FIG. 5 shows mobile application download link 502, frequently asked questions 504, login page 506, change picture link 508, an edit profile link 510, optional picture or avatar 512, establishment name field 518, establishment location field 520, "go" button 522, user's name 524, trust rating 526, visits 528, optional advertisement 530, user comment 532, user information 534, location 536, age 538, sex 540, occupation 542, worth waiting for comment 544, home page 546, Twitter address 548, similar establishments 550, distance 552, and wait time 554.

In other embodiments, the web page 500 may include additional components and/or may not include all of the components listed above.

Web page 500 shows the comment of the user about various establishments. Web page 500 includes features that indicate the trustworthiness of the user. The comments 532 provide information critiquing various establishments. Additionally, comments 532 may provide an indication of how critical the user is of different establishments. User comments 532 include the name and address of the establishment, the comment and the date of the comment and an expressed opinion of the visited establishment. Trust rating 526 is a numerical rating of how trustworthy the user giving the comment is, where higher number reflects higher trust. User information 534 is provided next to user comments 526 for visual convenience for a patron looking at web page 500 to also look at user information. User information 534 includes name 524 of user making comment for patron viewing web page 500. User information 534 includes a location 536 of residence, age 538, sex 540, occupation 542, a comment 532 indicating what the user deems worth waiting for, user home page 546, and Twitter address 548 of the user so that other patrons can tweet the user. User information includes the total overall number of visits 528 made by user and the last visit date 528. At the bottom of the page the user finds browsable information on featured establishments 550 that includes the name, distance 552 and current wait-times 554 that tells a user how far away a featured establishment is and how long the wait will be. Change picture link 508 is provided to enable a user to change his or her picture or avatar. Edit profile link 510 is provided to enable a user to change his or her profile. Download link 502 is also provided at the top of web page 500 for a patron to download the mobile application. FAQ link 504 is also provided at the top of web page 500 for patron to quickly access answers to frequently asked questions. Login page link 506 is also provided at the top of web page 500 for patron to login to use the web page 500. User information includes the establishment name field 518 where the user enters the name of the establishment the user has waited to utilize. User information includes the establishment location field 520 that the user enters. User information includes the "Go" field 520 that must be clicked on in order to submit information provided in the establishment name filed 518 and the establishment location field 520 and display Webpage 400. User information also includes the advertisement 530 that can be used and purchased by an advertiser.

Figure 6:
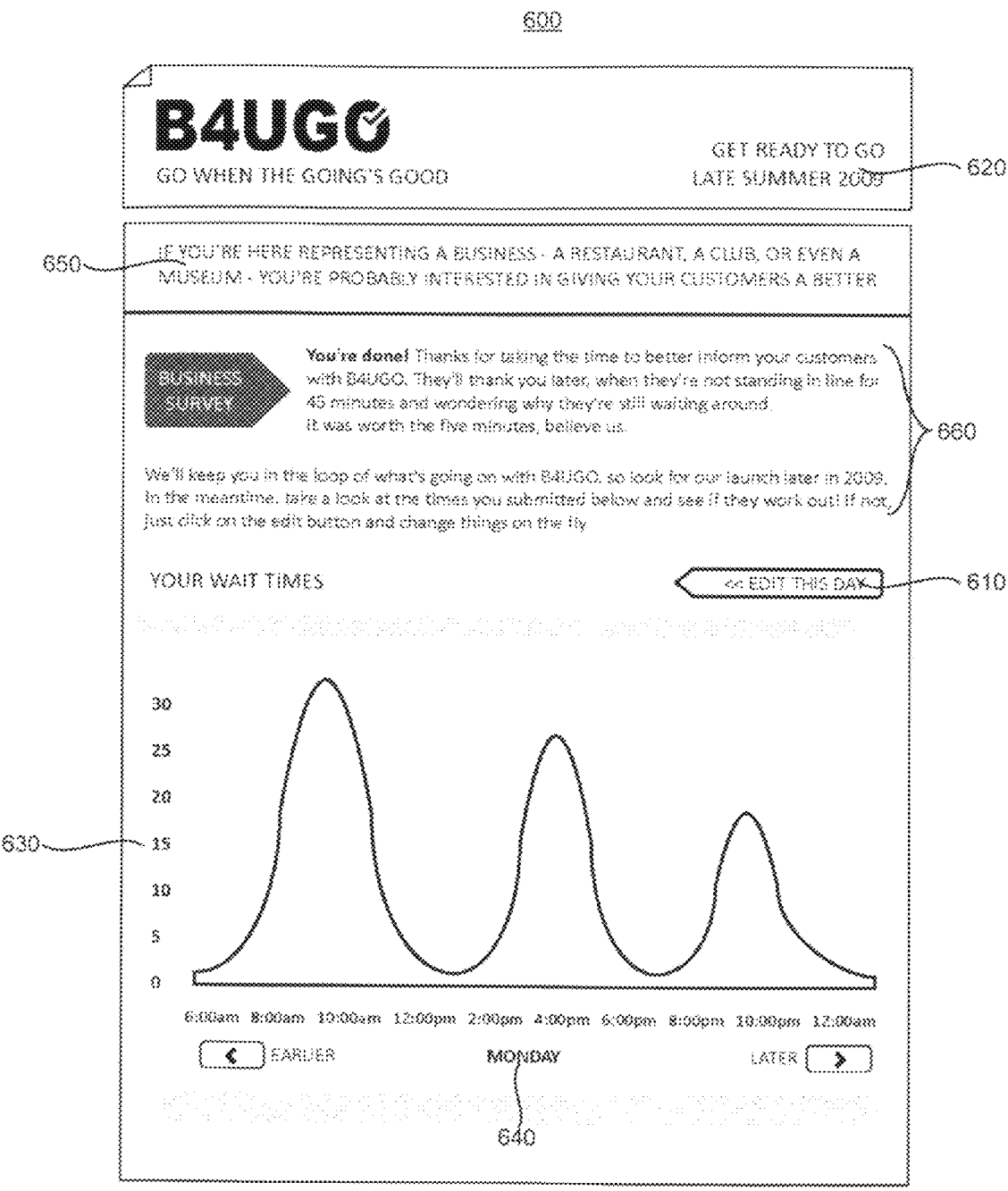
FIG. 6 illustrates an example of a screenshot of a web page for an operator of an establishment to enter and edit wait-times related to their establishment.

FIG. 6 illustrates an example of a screenshot of a web page 600 for an operator of an establishment to enter and edit wait-times related to their establishment. FIG. 6 shows an edit button 610, a date and season display 620, a wait-times graph 630, a day listing 640, an encouragement statement 650 and a thank you statement 660. In other embodiments, the web page 600 may include additional components and/or may not include all of the components listed above.

Edit button 610 allows operator to edit wait-times pertaining to their establishment. Date and season display 620 at the top of web page 600 describes current date and season at the time of the editing wait times or at a time of interest to the viewer. The wait times for a particular time of year may be based on wait times that were recorded at another time of year, but that have been adjusted based on expected seasonal increases or seasonal decreases in traffic. Wait-times graph 630 shows wait-times of operator's establishment on y-axis versus specific times during the course of day on x-axis. Day listing 640 shows days of the week, which may be displayed beneath x-axis of graph 630 to show the current day of the week that is being viewed, as well for further clarification of time of wait times. Encouragement statement 650 is a statement encouraging operator to provide information on web page 600 is provided. Thank you statement 660 is also provided as well for thanking an operator for completing the information on web page 600.

FIG. 7 illustrates an example of a screenshot of a web page 700 for an operator of an establishment to verify information about wait-times related to their establishment. FIG. 7 shows a screenshot with a peak time slider 710, a start time slider 720, an end time slider 730, number-of-times buttons 740, an establishment name 750, an address 760, a contact name 770, an e-mail address 780, a month listing 785, a weather affect indication 790, a school year affect indication 795 and a "done" button 798. In other embodiments, web page 700 may include additional components and/or may not include all of the components listed above.

Peak time slider 710 indicates a peak time, which is the maximum wait time for a given period of time. Operators can enter start times with start time slider 720 by sliding the slider with a cursor to a time a wait line forms. End time slider 730 indicates the time that wait line goes away. Number-of-times buttons 740 allows the operator to select the number of time periods, during a given day, for which a line forms and the user wants to enter information about. The operator can be selected by a cursor chosen by the operator including whether the establishment is closed or not. Multiple time periods may be entered for a single day and each day of the week and may have a different wait-time period. Establishment name 750 is also listed on the web page 700 for indicating name of establishment visited for future reference. Address 760 or multiple addresses are also listed on the web page 700 indicating the address of establishment visited for future reference. Contact name 770 is also listed on the web page 700 to indicate a contact at establishment in the event a patron wishes to contact someone at establishment. E-mail address 780 is also listed on the web page 700 in the event a patron wishes to contact someone at establishment by e-mail. Month listing 785 lists the holidays that the establishment is not open for future patron reference. Weather affect indication 790 gives an indication of whether the waiting lines are affected by weather conditions. School year affect indication 795 gives an indication if wait lines are affected by school year. "Done" button 798 is also provided to close-out the field when the operator has completed information on web page 700.

Figure 8:
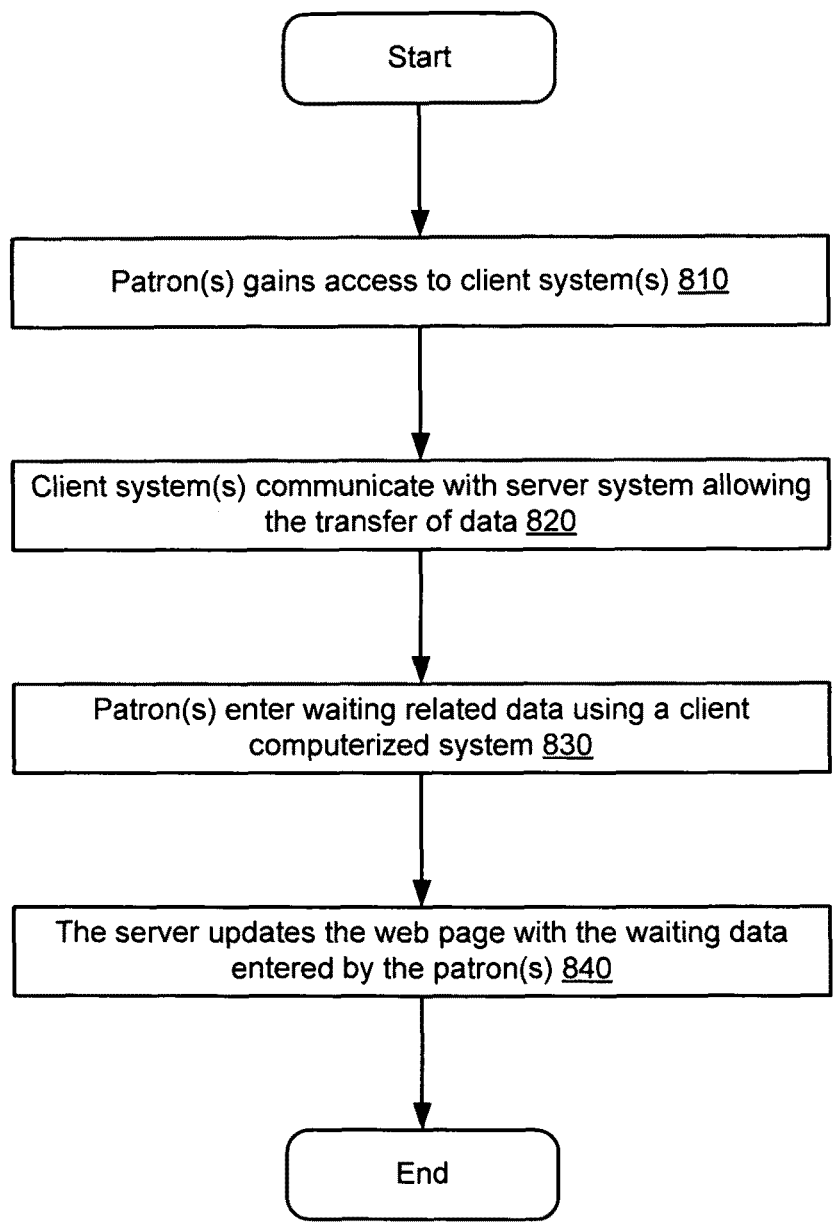
FIG. 8 illustrates a flowchart of an example of a method for a patron to enter a schedule and an availability of an establishment's products and services using a client system of a computerized system.

FIG. 8 illustrates a flowchart of an example of a method 800 for a patron to enter a schedule and an availability of an establishment's products and services using a client system of a computerized system. In step 810, any patron or a plurality of patrons gains access to a client system or a plurality of client systems. In step 820, the client system or client systems are in communication with the server system of the overall computerized system with a communications network that allows for a transfer of computer related data. In step 830, the patron or patrons enter waiting related data onto the web pages that are associated with a schedule and availability of an establishment's products and services using a client system of a computerized system. These web pages and the waiting related data were previously described in FIGS. 3, 4 and 5 and their descriptions. In step 840, the server system updates the waiting related data entered from the client systems onto the web pages.

In an embodiment, each of the steps of method 800 is a distinct step. In another embodiment, although depicted as distinct steps in FIG. 8, steps 810-840 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Figure 9:
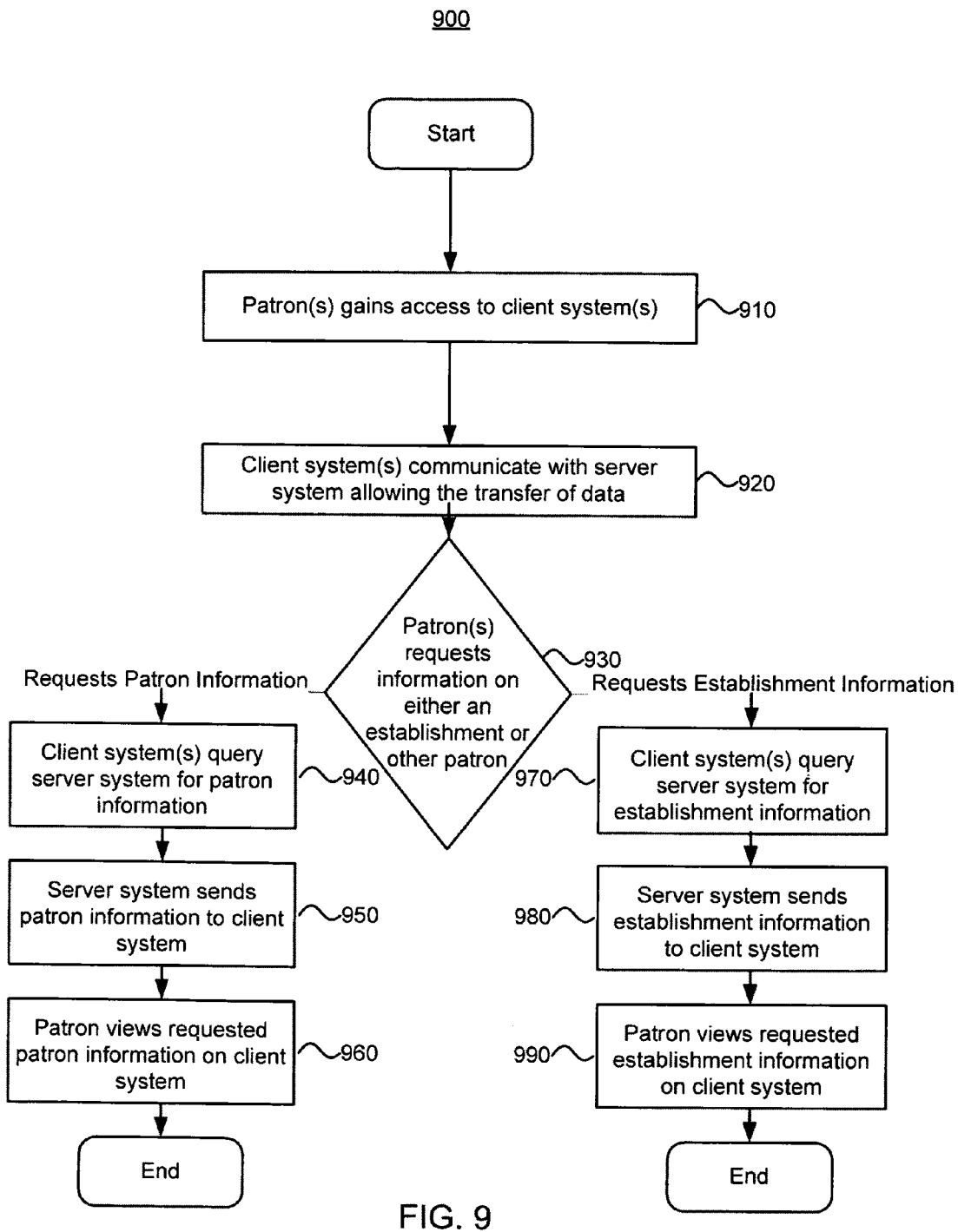
FIG. 9 illustrates a flowchart of an example of a method for a patron to request information about another patron or establishment using a client system of a computerized system.

FIG. 9 illustrates a flowchart of an example of a method 900 for a patron to request information about another patron or establishment using a client system of a computerized system. In step 910, any patron or a plurality of patrons gains access to a client system or a plurality of client systems. In step 920, the client system or client systems are in communication with the server system of the overall computerized system with a communications network that allows for a transfer of computer related data. In step 930, the patron makes the decision whether they want to request information regarding a patron or an establishment. Should the patron choose to request information regarding a patron, in step 940 the client system queries the server system for patron information. In step 950, the server system sends the requested patron information to the client system. In step 960, the patron views the requested information on the client system. Should the patron choose to request information regarding an establishment, in step 970 the client system queries the server system for establishment information. In step 980 the server system sends the establishment information to the client system, in step 990 the patron views the requested information on the client system.

In an embodiment, each of the steps of method 900 is a distinct step. In another embodiment, although depicted as distinct steps in FIG. 9, steps 910-990 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

Figure 10:
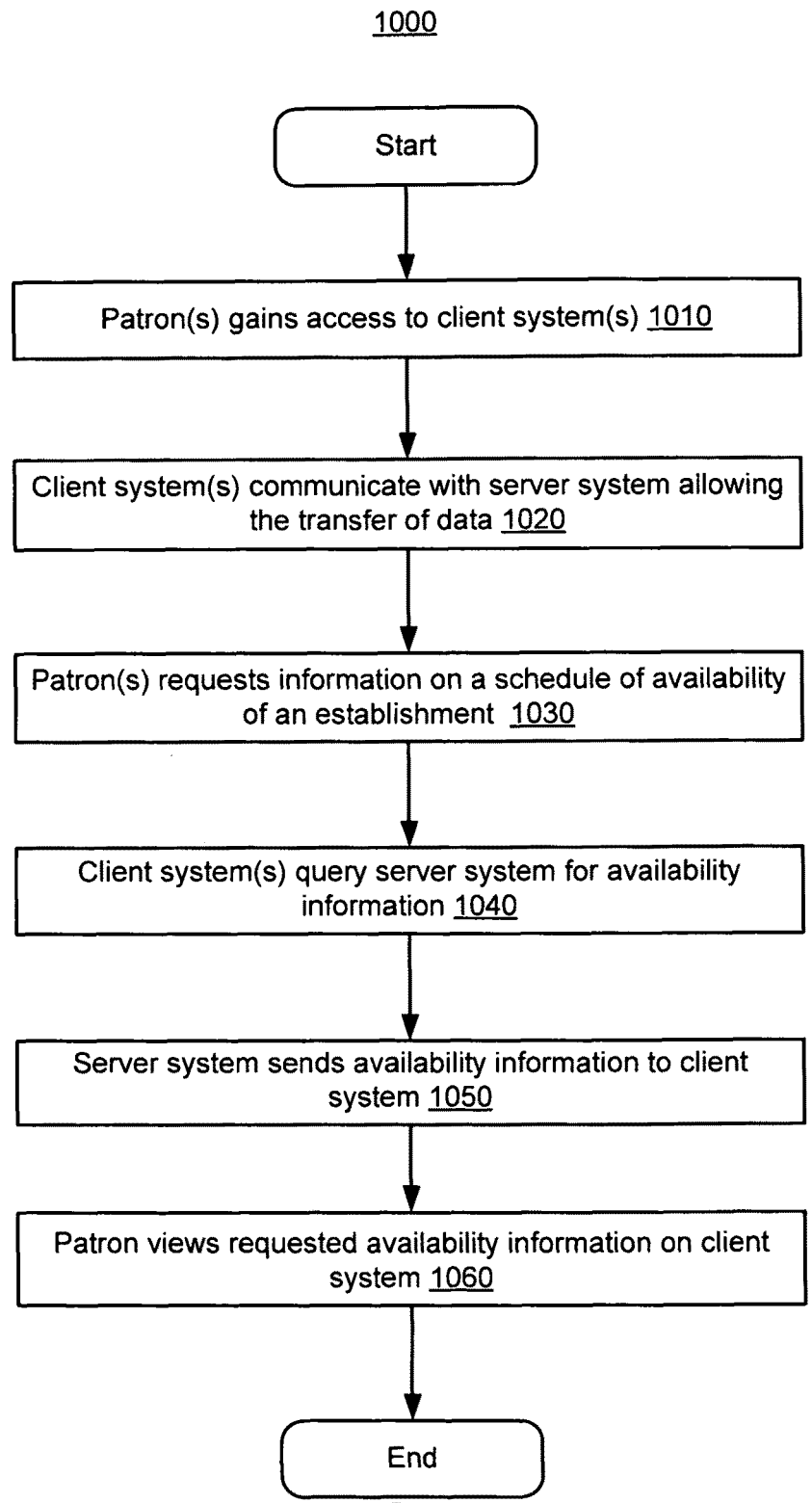
FIG. 10 illustrates a flowchart of an example of a method for a patron to determine a schedule and an availability of an establishment's products and services using a server system.

FIG. 10 illustrates a flowchart of an example of a method 1000 for a patron to determine a schedule and an availability of an establishment's products and services using a server system. In step 1010, the patron gains access to the client system or a plurality of client systems. In step 1020, the server system is in communication with one or more patrons and one or more client systems over a communications network, such as the Internet. In step 1030, the patron requests information on a schedule of availability of an establishment. In step 1040, the client system or plurality of client systems query the server system, or plurality of server systems, for availability information. In step 1050, the server system, or plurality of server systems, sends availability information to the client system, or plurality of client systems. In step 1060, the patron views the availability information on the client system.

In an embodiment, each of the steps of method 1000 is a distinct step. In another embodiment, although depicted as distinct steps in FIG. 10, steps 1010-1060 may not be distinct steps. In other embodiments, method 1000 may not have all of the above steps and/or may have other steps in addition to or instead of those listed above. The steps of method 1000 may be performed in another order. Subsets of the steps listed above as part of method 1000 may be used to form their own method.

Figure 11:
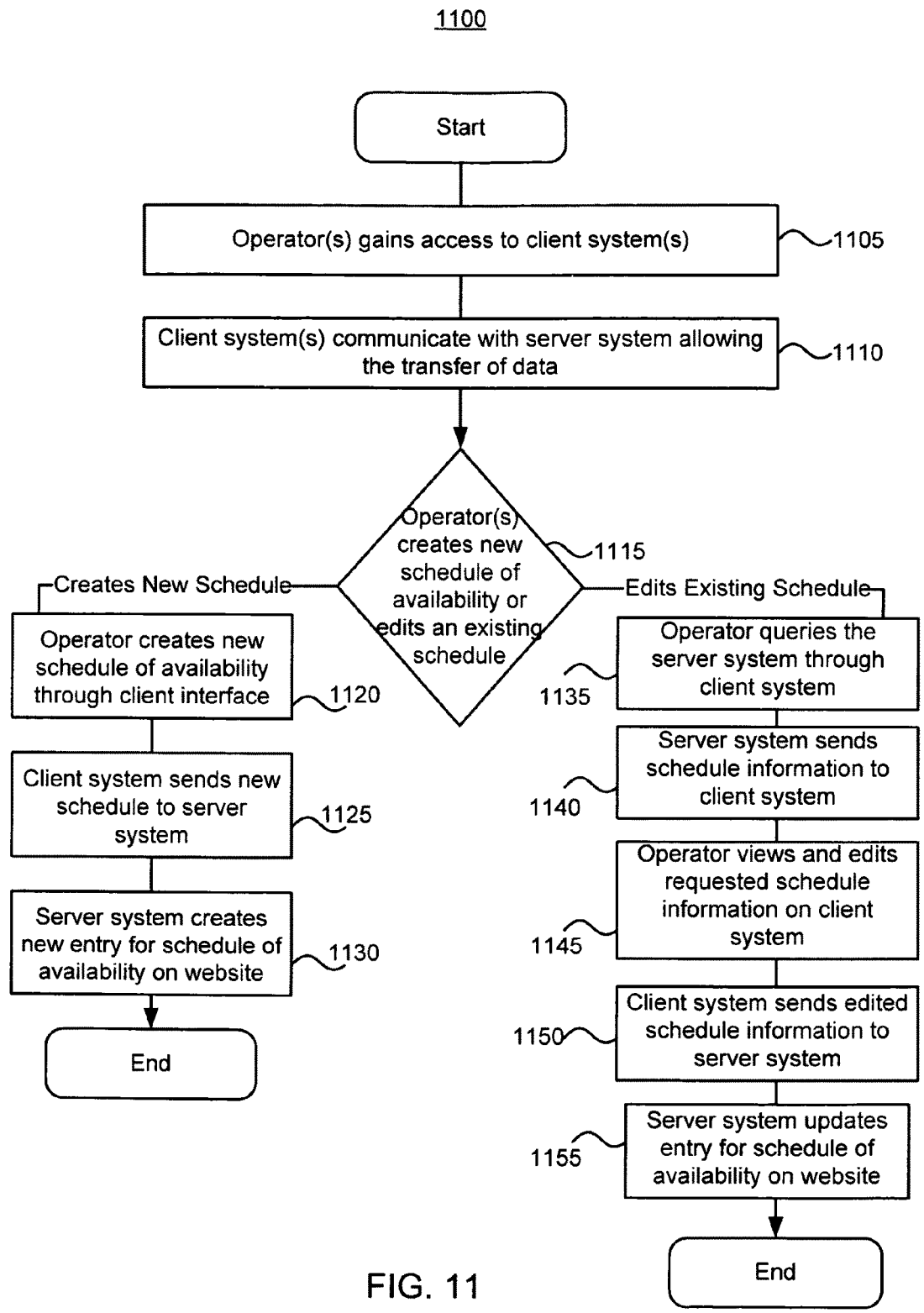
FIG. 11 illustrates a flowchart of an example of a method for an operator to create and edit a schedule and an availability of an establishment's products and services using a server system of a computerized system.

FIG. 11 illustrates a flowchart of an example of a method 1100 for an operator to create and edit a schedule and an availability of an establishment's products and services using a server system of a computerized system. In step 1105, an operator or operators gain access to a client system or client systems. In step 1110, the client system is in communication with the server system with a communications network such as the Internet. In step 1115, the operator n step 930, the operator makes the decision whether they want to create an existing schedule and availability or edit an existing schedule. Should the operator decide to create a new schedule and availability, in step 1120 the operator creates a new schedule through the client system or plurality of client systems. In step 1125, the client system, or plurality of client systems, sends the new schedule to the server system, or plurality of server systems. In step 1130, the server system, or plurality of server systems create a new entry into the website database for the new schedule. Should the operator choose to edit and existing schedule and availability, in step 1135 the operator queries the server system, or plurality of server systems, through the client system. In step 1140 the server system sends the requested schedule information to the client system. In step 1145, the operator views and edits the schedule information using the client system. In step 1150, the client system sends the edited schedule to the server system. In step 1155, the server system updates the database entry for the schedule and availability for the website.

In an embodiment, each of the steps of method 1100 is a distinct step. In another embodiment, although depicted as distinct steps in FIG. 11, steps 1105-1155 may not be distinct steps. In other embodiments, method 1100 may not have all of the above steps and/or may have other steps in addition to or instead of those listed above. The steps of method 1100 may be performed in another order. Subsets of the steps listed above as part of method 1100 may be used to form their own method.

Figure 12:
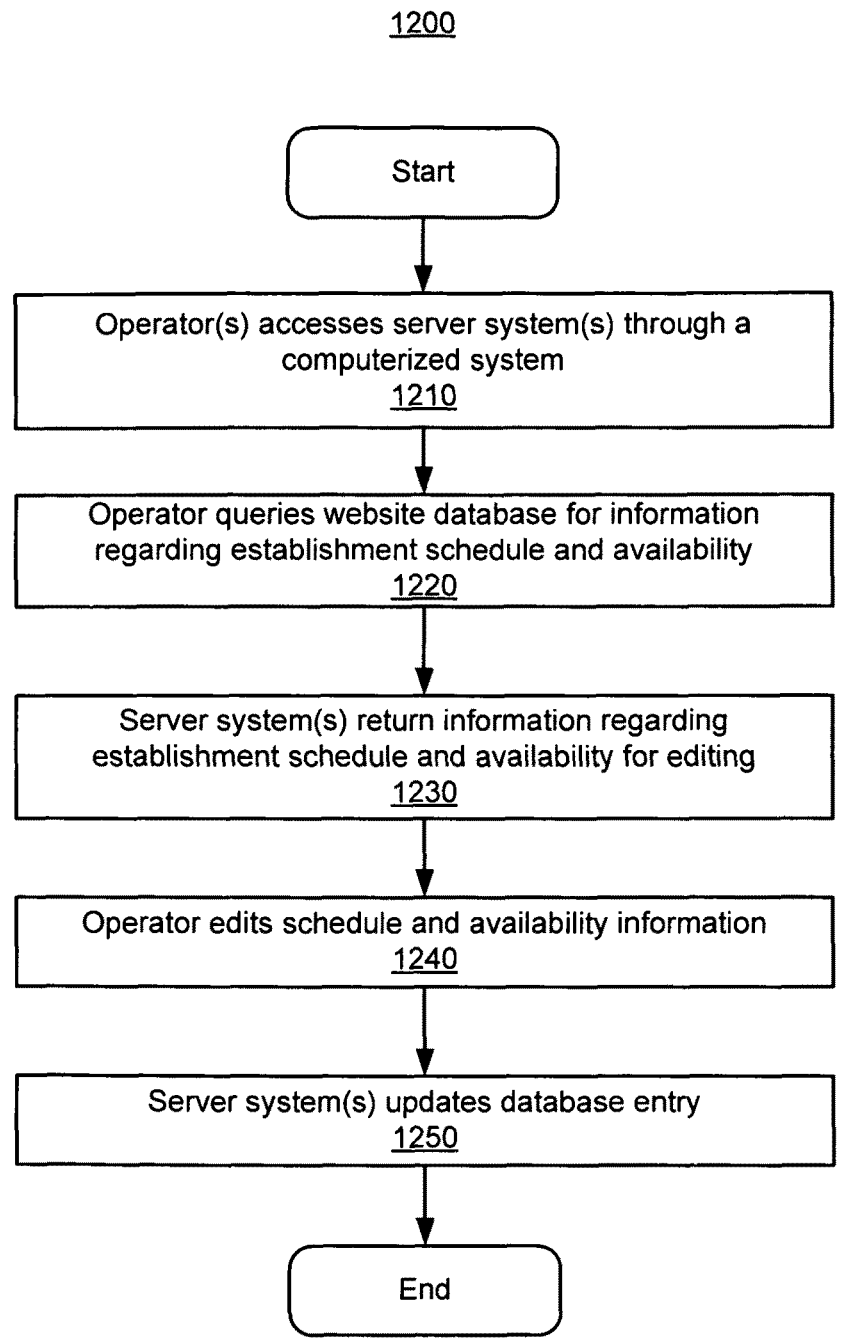
FIG. 12 illustrates a flowchart of an example of a method of editing a schedule and an availability of an establishment's products and services server side.

FIG. 12 illustrates a flowchart of an example of a method 1200 of editing a schedule and an availability of an establishment's products and services server side. In step 1210, the operator accesses the server system, plurality of server systems, through a computerized system. In step 1220, the operator queries the website database for information regarding establishment schedule and availability. In step 1230, the server system returns the requested information to the operator. In step 1240, the operator edits the information. In step 1250, the server system updates the database entry for the website.

In an embodiment, each of the steps of method 1200 is a distinct step. In another embodiment, although depicted as distinct steps in FIG. 12, steps 1210-1250 may not be distinct steps. In other embodiments, method 1200 may not have all of the above steps and/or may have other steps in addition to or instead of those listed above. The steps of method 1200 may be performed in another order. Subsets of the steps listed above as part of method 1200 may be used to form their own method.

Figure 13:
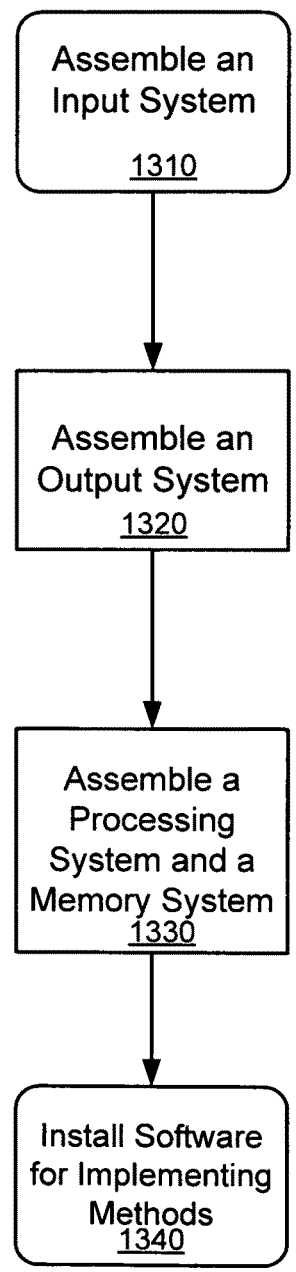
FIG. 13 illustrates a flowchart of an example of a method of assembly for the system of FIG. 2B.

FIG. 13 illustrates a flowchart of an example of a method 1300 of assembly for the system of FIG. 2B. In step 1310, an input system is assembled. In step 1320, an output system and input system are assembled. In step 1330, a processor system, memory system and input and output systems are assembled. Step 1330 may also include assembling a communication interface and a power source. In step 1340, systems are connected together. In step 1350, software is installed for implementing a method for determining a schedule and availability of an establishment's products and services for a client system and a server system and method for providing and editing a schedule and availability of an establishment's products and services for a client system and a server system is downloaded onto memory system.

In an embodiment, each of the steps of method 1300 is a distinct step. In another embodiment, although depicted as distinct steps in FIG. 10, steps 1310-1350 may not be distinct steps. In other embodiments, method 1300 may not have all of the above steps and/or may have other steps in addition to or instead of those listed above. The steps of method 1300 may be performed in another order. Subsets of the steps listed above as part of method 1300 may be used to form their own method. A similar method may be used to assemble the system of FIG. 2A. However in the method for assembling the system of FIG. 2A, the analogous step to step 1300 may also include assembling a GPS system.

Extensions and Alternatives

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method comprising:
sending, via a server having a processor system including at least one processor, information to a user network device, which causes a schedule and availability of a service provided by an establishment to be displayed, the schedule being based on usage of the service provided by the establishment and the schedule includes at least an indication of one or more times when a user of the service is expected to need to wait for the service;
receiving, via a server, information about wait times including at least one expected wait time, from a network device of an operator of an establishment;
determining, via a processor system, information for creating a graph of the information about the wait times from the operator;
receiving, via the server, information about wait times from a network device of a user of the services of the establishment;
determining, via the server, information for creating a graph of the information about the wait times from the user of the establishment, the user not being an operator of the establishment, does not work for the establishment, and does not have an ownership in the establishment; and
sending from the server to a user system one or more elements to be rendered by a browser, which when rendered by the browser cause the graph of the information about the wait times from the operator and the graph of the information about the wait times from the user to be displayed by the browser;
the determining of the best fit of the curve to the information including at least:
determining, by the server, a time when a wait line is predicted to form, based on available data;
determining, by the server, a prediction of a maximum wait time, which is a prediction of an amount of time to be spent waiting in line when the wait line is at its longest length, based on available data;
determining, by the server, a time when the wait line is predicted to disappear, based on available data; and
determining, by the server, a curve that is representative of the wait times at different times of the day, the determining of the curve requiring, as input information, only
the time when the wait line is predicted to form,
the maximum wait time predicted, and
the time when the wait line is predicted to disappear.

2. The method of claim 1, the sending of the information, when rendered, causes the current wait time for the establishment to be displayed including at least causing a symbol representative of a duration of time equal to the current wait time to be displayed.

3. The method of claim 1, the indication of the one or more times when the user is expected to need to wait for the service including at least a line graph descriptive of wait times for the service, the line graph being based on operator input if operator input is available, and market research that is based on user input if user input is available.

4. The method of claim 1, the information including at least the identifying information about the establishment including the location.

5. The method of claim 1, the information including at least information regarding user reports and comments on the schedule and availability of the service of the establishment.

6. The method of claim 1, the information including at least information about similar establishments within a given distance of the establishment.

7. The method of claim 1, the graph of the wait times from the operator and the graph of the information about the wait times from the user being superimposed on one another.

8. The method of claim 1, further comprising:
determining a best fit of a curve to the information about the wait times from the user; and
the one or more elements also including elements, which when rendered by the browser, cause the graph of the curve to be displayed by the browser.

9. The method of claim 1, further comprising:
receiving collected wait time data, via a machine having a processor system and a storage system having a storage medium storing at least
a collection of wait time data; and
user profile information associated with each wait time data input;
the processor system determining a ranking of a user based on a determination of an accuracy of wait time data input by the user.

10. The method of claim 9, wherein the user profile information include at least personal information about the user.

11. The method of claim 9, the determining of the ranking of the user includes at least
receiving new information indicative of a degree to which the user can be trusted, the degree to which the user can be trusted depending on user submissions of ratings from at least another user as to a trustworthiness of the user's data submissions representing wait times;
combining the new information with collected historical data indicative of a degree to which the user can be trusted;
analyzing the combined data, and
creating an overall user trust rating based on the analyzing.

12. The method of claim 9, further comprising:
the processor system retrieving a weighting for the user that is based on the user profile information, and
the processor system determining an adjustment to at least one wait time value represented in the wait time data, the adjustment to the at least one wait time value being based on the weighting.

13. The method of claim 1, further comprising: receiving search queries for entities, by name or location.

14. The method of claim 1, further comprising: receiving information from the user about the user, an establishment, and other user which amends existing information on the server.

15. The method of claim 1, the receiving of information from the user including at least receiving information about variables affecting the schedule and availability of a service of an establishment.

16. A method comprising:
sending, via a server having a processor system including at least one processor, information to a user network device, which causes a schedule and availability of a service provided by an establishment to be displayed, the schedule being based on usage of the service provided by the establishment and the schedule includes at least an indication of one or more times when a user is expected to need to wait for a service;
receiving, via a server, information about wait times from a network device of an operator of an establishment;
determining, via a processor system, information for creating a graph of the information about the wait times from the operator;
receiving, via the server, information about wait times from a network device of a user of the establishment;
determining, via the server, information for creating a graph of the information about the wait times from the user, the user not being an operator of the establishment, does not work for the establishment, and does not have an ownership in the establishment; and
sending from the server to a user system one or more elements to be rendered by a browser, which when rendered by the browser cause the graph of the information about the wait times from the operator and the graph of the information about the wait times from the user to be displayed by the browser;
the determining, via the server, of the information for creating the graph of the information about the wait times from the user, including at least:
  determining, by the server, a time when a wait line is predicted to form, based on available data;
  determining, by the server, a prediction of a maximum wait time, which is a prediction of an amount of time to be spent waiting in line when the wait line is at its longest length, based on available data;
  determining, by the server, a time when the wait line is predicted to disappear, based on available data; and
  determining, by the server, a curve that is representative of the wait times at different times of the day, the determining of the curve requiring, as input information, only the time when the wait line is predicted to form, the maximum wait time predicted, and the time when the wait line is predicted to disappear.

17. One or more non-transitory machine readable media; the one or more non-transitory machine readable media having stored thereon one or more machine instructions, which when invoked cause a method to be implemented, the method comprising:
sending, via a server having a processor system including at least one processor, information to a user network device, which causes a schedule and availability of a service provided by an establishment to be displayed, the schedule being based on usage of the service provided by the establishment and the schedule includes at least an indication of one or more times when a user is expected to need to wait for a service;
receiving, via the server, information about wait times including at least one expected wait time, from a network device of a manager of an establishment;
determining, via the processor system, information for creating a graph of the information about the wait times from the manager;
receiving, via the server, information about wait times from a network device of a user of the establishment, the user of the establishment being a patron of the establishment;
determining, via the server, information for creating a graph of the information about the wait times from the user, and
sending from the server to a user system one or more elements to be rendered by a browser, which when rendered by the browser cause the graph of the information about the wait times from the manager and the graph of the information about the wait times from the user to be displayed by the browser;
the determining, via the server, of the information for creating the graph of the information about the wait times from the user, including at least:
determining, by the server, a time when a wait line is predicted to form, based on available data;
determining, by the server, a prediction of a maximum wait time, which is a prediction of an amount of time to be spent waiting in line when the wait line is at its longest length, based on available data;
determining, by the server, a time when the wait line is predicted to disappear, based on available data; and
determining, by the server, a curve that is representative of the wait times at different times of the day, the determining of the curve requiring, as input information, only
  the time when the wait line is predicted to form,
  the maximum wait time predicted, and
  the time when the wait line is predicted to disappear.

18. The one or more non-transitory machine readable media of claim 17, the sending of the information, when rendered causes the current wait time for the establishment to be displayed including at least causing a symbol representative of a duration of time equal to the current wait time to be displayed.

19. The one or more non-transitory machine readable media of claim 17, the indication of the one or more times when the user is expected to need to wait for the service including at least a line graph descriptive of wait times for the service, the line graph being based on
  operator input if operator input is available, and
  market research that is based on user input if user input is available.

20. The one or more non-transitory machine readable media of claim 17, the information including at least the identifying information about the establishment including the location.

21. The one or more non-transitory machine readable media of claim 17, the information including at least information regarding user reports and comments on the schedule and availability of the service of the establishment.

22. The one or more non-transitory machine readable media of claim 17, the information including at least information about similar entities within a given distance of the establishment.

23. The one or more non-transitory machine readable media of claim 17, the information including at least information about the location and wait times of similar entities within a given distance of the establishment.

24. The one or more non-transitory machine readable media of claim 17, the information including at least information about other attractions within a given distance of the establishment.

25. The one or more non-transitory machine readable media of claim 17, the information including at least personal information of the user.

26. The one or more non-transitory machine readable media of claim 17, the graph of the wait times from the manager and the graph of the information about the wait times from the user being superimposed on one another.

27. The one or more non-transitory machine readable media of claim 17, the method further comprising determining a best fit of a curve to the information about the wait times from the user; and the one or more elements also including elements, which when rendered by the browser cause the graph of the curve to be displayed by the browser.

\* \* \* \* \*